United States Patent
Kwon et al.

(10) Patent No.: US 8,345,792 B2
(45) Date of Patent: Jan. 1, 2013

(54) METHOD OF TRANSMITTING DATA FOR DIGITAL BROADCASTING IN WIRELESS COMMUNICATION SYSTEM

(75) Inventors: Yeong Hyeon Kwon, Anyang-si (KR); Seung Hee Han, Anyang-si (KR); Hyun Woo Lee, Anyang-si (KR); Jin Sam Kwak, Anyang-si (KR); Dong Cheol Kim, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 12/681,181

(22) PCT Filed: Oct. 23, 2008

(86) PCT No.: PCT/KR2008/006276
§ 371 (c)(1),
(2), (4) Date: Apr. 1, 2010

(87) PCT Pub. No.: WO2009/057913
PCT Pub. Date: May 7, 2009

(65) Prior Publication Data
US 2010/0272210 A1    Oct. 28, 2010

(30) Foreign Application Priority Data
Oct. 29, 2007    (KR) .................. 10-2007-0108924

(51) Int. Cl.
*H04L 27/00* (2006.01)

(52) U.S. Cl. ........ 375/295; 375/259; 375/260; 375/285; 375/296

(58) Field of Classification Search .................. 375/295, 375/259, 260, 285
See application file for complete search history.

(56) References Cited

U.S. PATENT DOCUMENTS

| | | | |
|---|---|---|---|
| 7,724,838 B2 * | 5/2010 | Mantravadi ................... | 375/295 |
| 8,102,786 B2 * | 1/2012 | Dang ............................. | 370/310 |
| 8,116,412 B1 * | 2/2012 | Jia et al. ....................... | 375/343 |
| 2003/0118123 A1 * | 6/2003 | Hudson et al. ................ | 375/295 |
| 2005/0206240 A1 * | 9/2005 | Enders et al. ................ | 307/10.1 |
| 2006/0198454 A1 * | 9/2006 | Chung et al. .................. | 375/260 |
| 2008/0025241 A1 * | 1/2008 | Bhushan et al. .............. | 370/312 |
| 2009/0034558 A1 * | 2/2009 | Mudulodu et al. ............ | 370/512 |
| 2010/0315985 A1 * | 12/2010 | Moon et al. .................... | 370/312 |

FOREIGN PATENT DOCUMENTS

| | | |
|---|---|---|
| JP | 2004-503181 A | 1/2004 |
| KR | 2007-0037278 A | 4/2007 |
| WO | WO 2006/048060 A1 | 5/2006 |
| WO | WO 2007/024073 A1 | 3/2007 |

* cited by examiner

*Primary Examiner* — Siu Lee
(74) *Attorney, Agent, or Firm* — McKenna Long & Aldridge LLP

(57) ABSTRACT

A method of transmitting data in a wireless communication system includes mapping first data to first symbols on a signal constellation, mapping second data assisting the first data to second symbols on the signal constellation, modulating the first symbols and the second symbols, and transmitting the modulated first symbols and the second symbols, wherein the distance between the first symbols is longer than that between the second symbols on the signal constellation.

4 Claims, 7 Drawing Sheets

[Fig. 1]
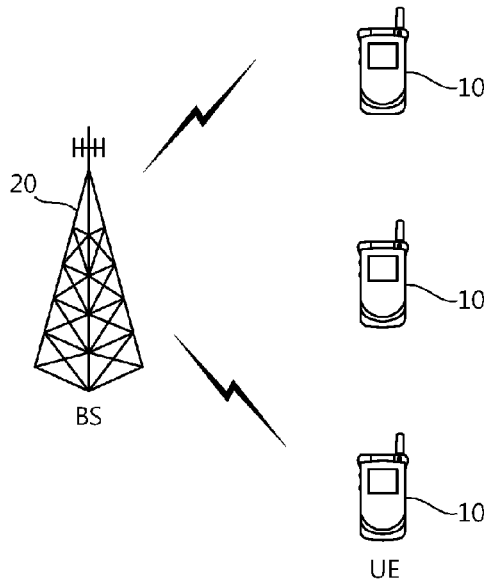
[Fig. 2]
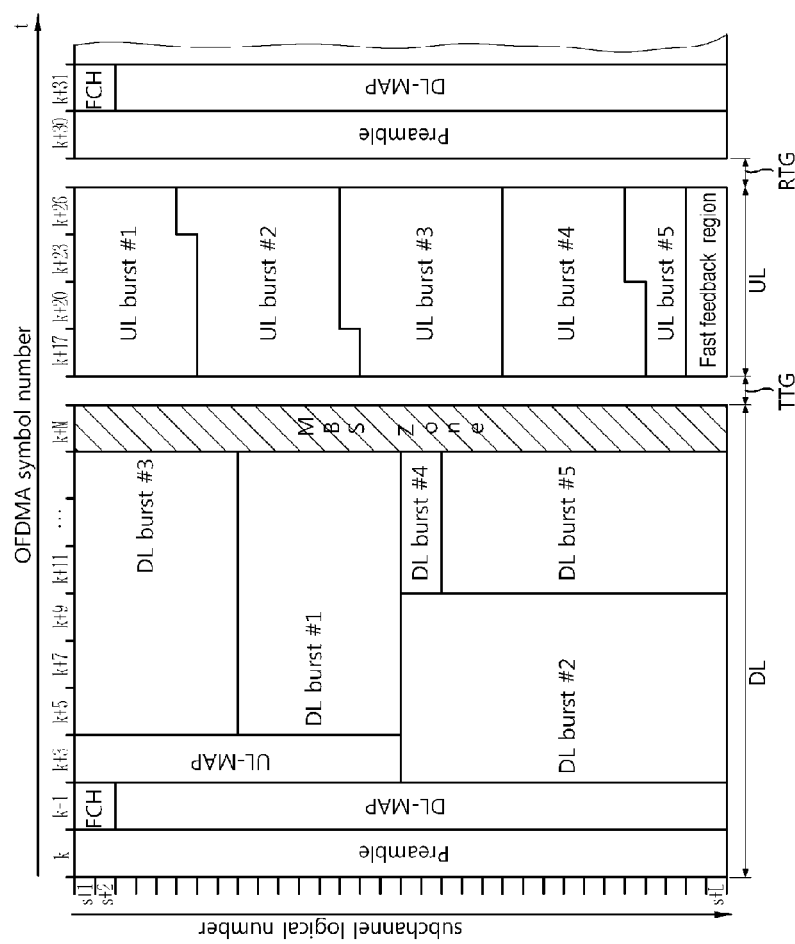

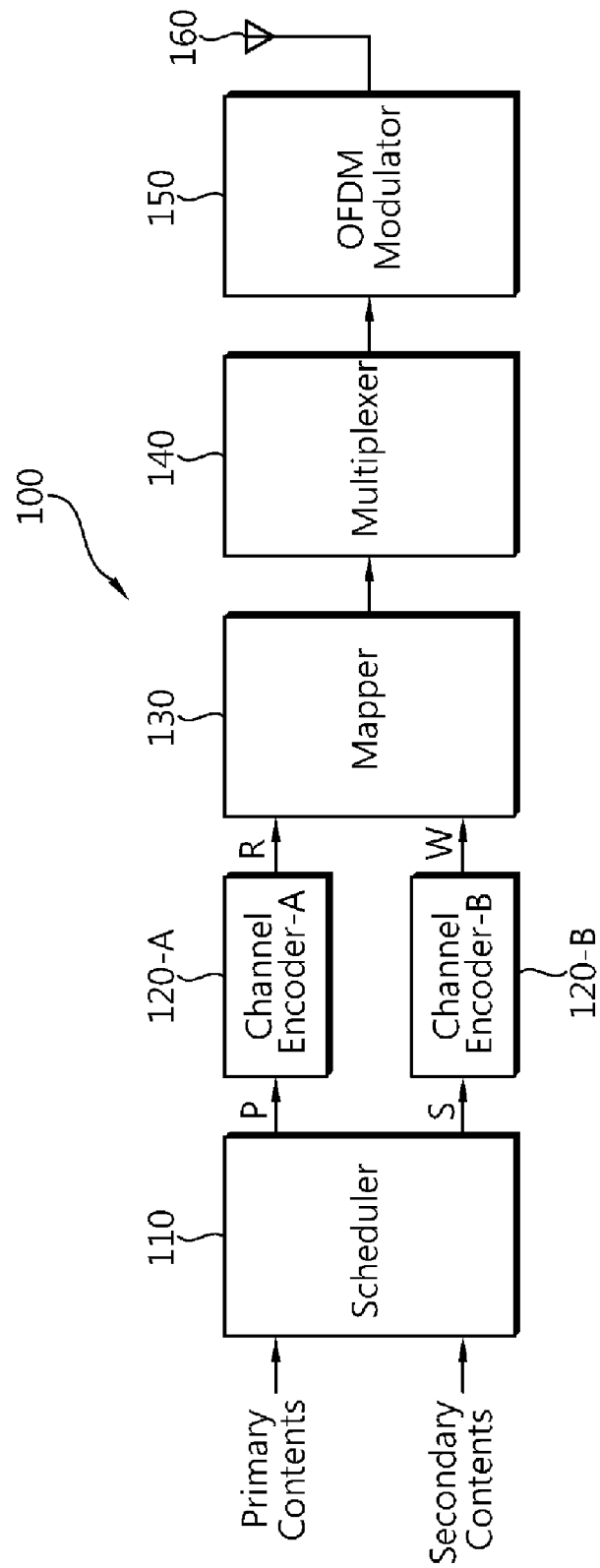
[Fig. 3]

[Fig. 4]
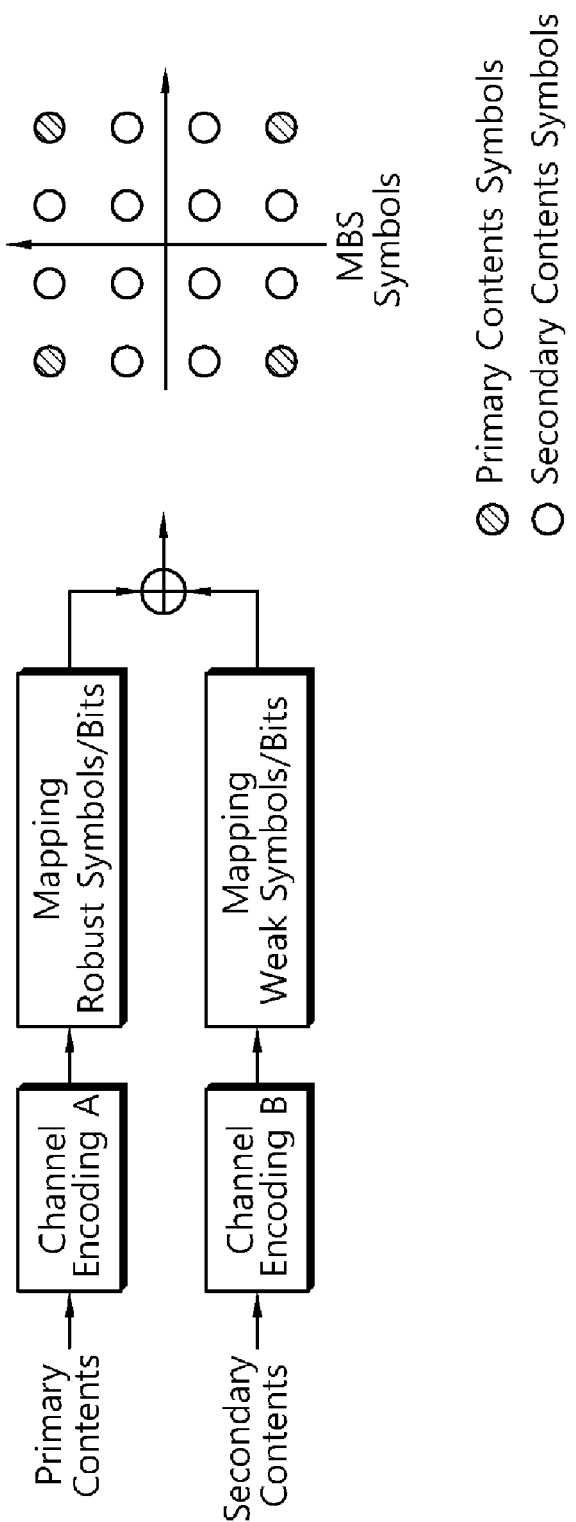

[Fig. 5]
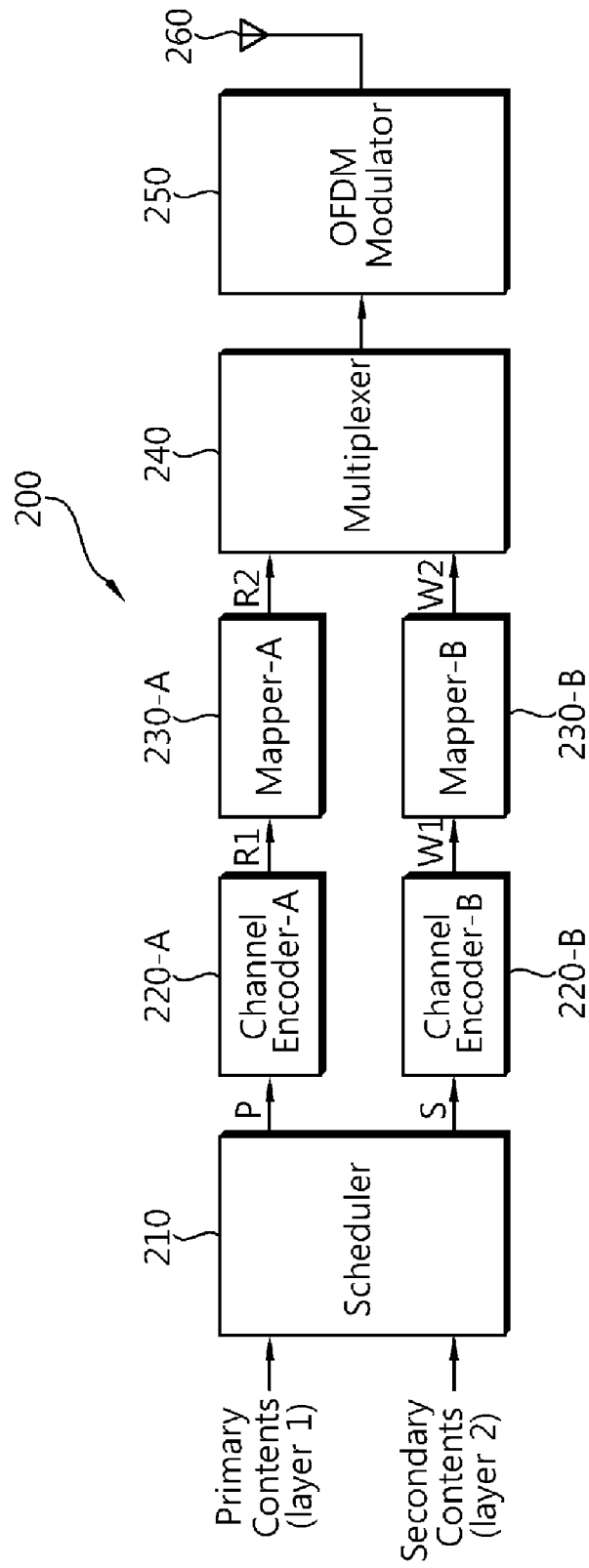

[Fig. 6]
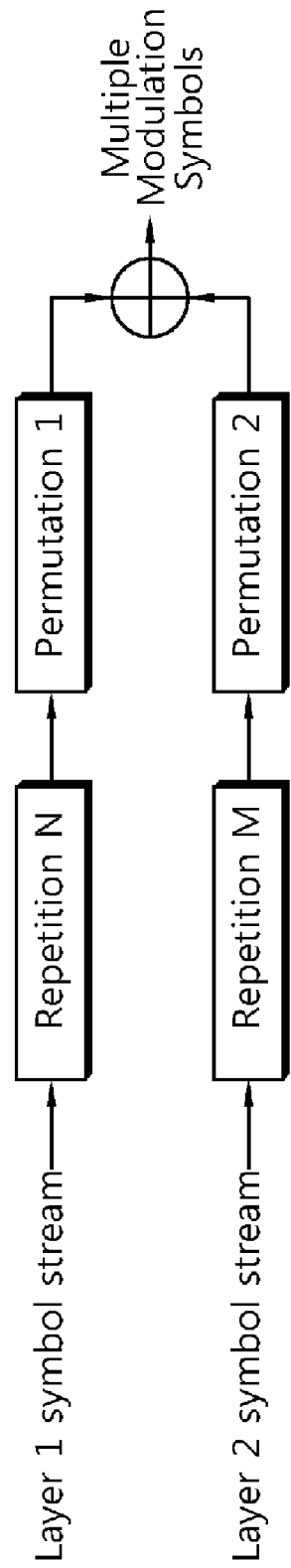

[Fig. 7]
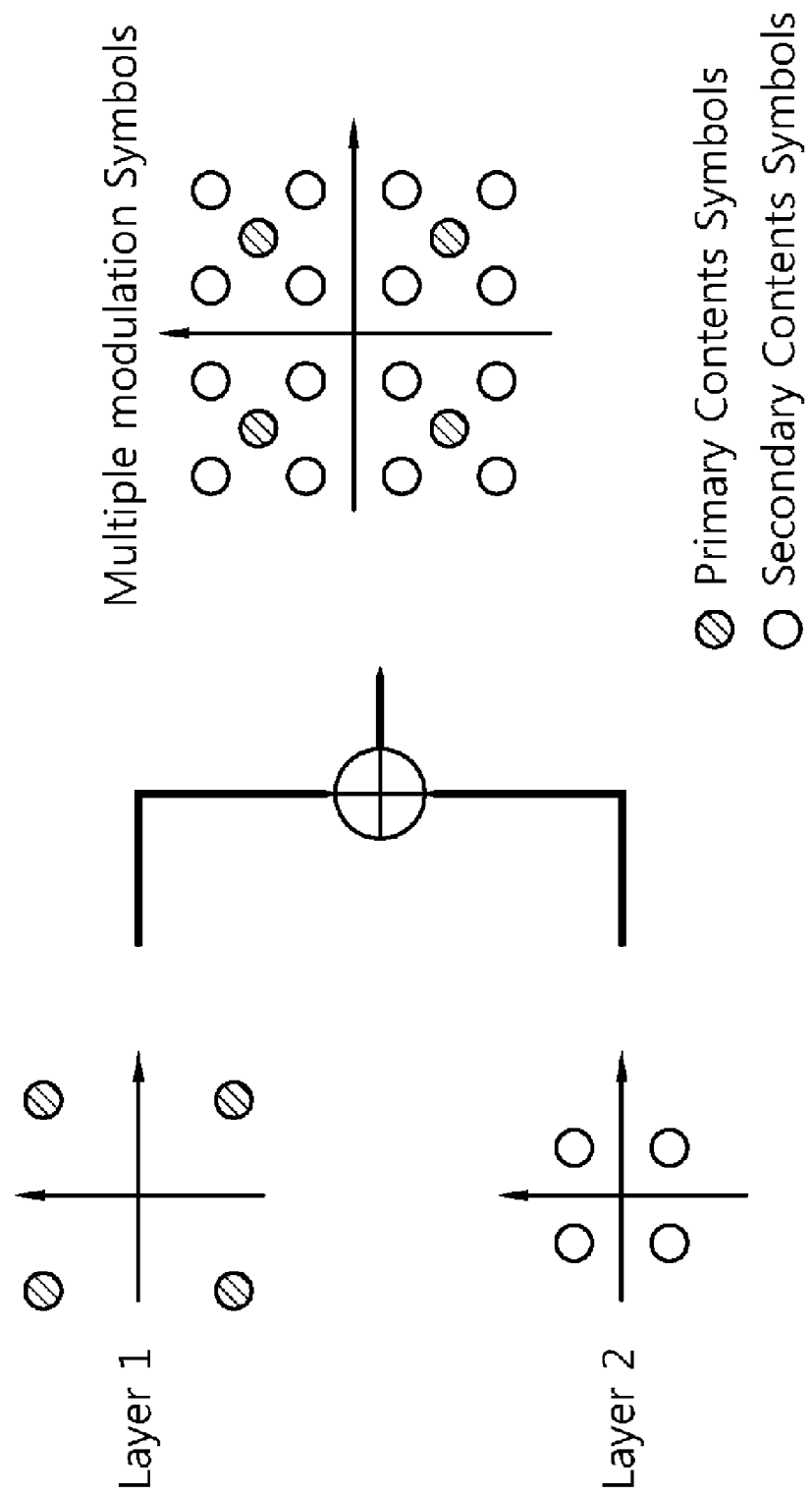

[Fig. 8]
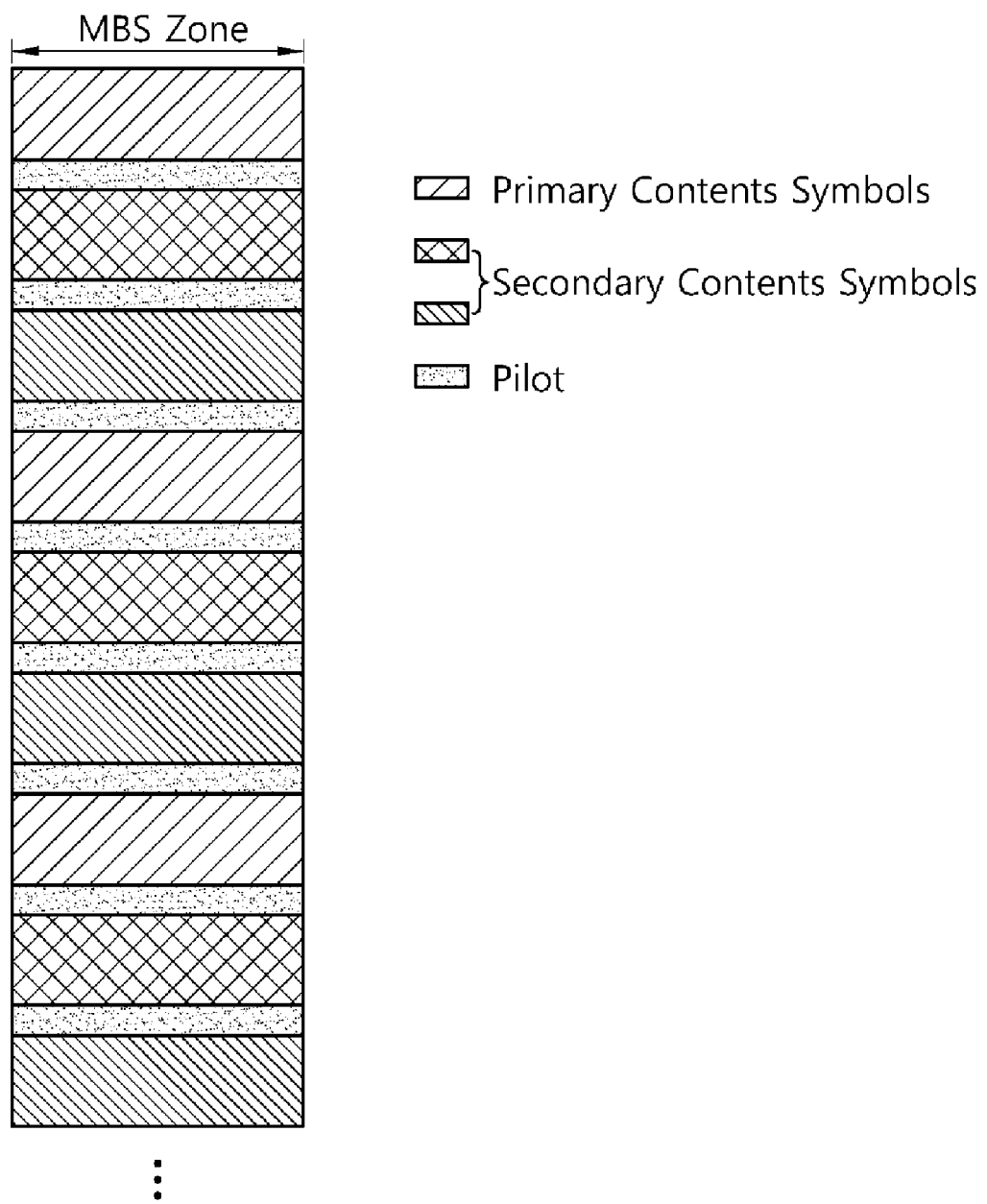

METHOD OF TRANSMITTING DATA FOR DIGITAL BROADCASTING IN WIRELESS COMMUNICATION SYSTEM

This application is a national phase application based on International Application No. PCT/KR2008/006276, filed on Oct. 23, 2008, which claims priority to Korean Patent Application No. 10-2007-0108924, filed on Oct. 29, 2007, all of which are incorporated by reference for all purposes as if fully set forth herein.

TECHNICAL FIELD

The present invention relates to wireless communications and, more particularly, to a method of providing contents of various qualities according to a channel environment or a reception performance of a user equipment in a digital broadcast service.

BACKGROUND ART

A $3^{rd}$ generation partnership project (3GPP) based on a wideband code division multiple access (WCDMA) wireless access technique is being extensively developed all over the world. An high speed downlink packet access (HSDPA), which may be defined as a first evolution of the WCDMA, provides a wireless access technique with a competitive edge in the mid-term future to the 3GPP. However, as requirements and expectations of users and service providers are continuously increasing and development of competitive wireless access techniques is proceeding, a new technical evolution in the 3GPP is requested to ensure competitiveness in the future.

One of systems considered in the post-3rd generation is an orthogonal frequency division multiplexing (OFDM) system that can attenuate an inter-symbol interference effect with a low complexity. The OFDM converts serially inputted data symbols into the N parallel data symbols, includes them in the N separated subcarriers, and transmits the same. The subcarriers maintain orthogonality in a frequency domain. The respective orthogonal channels experience mutually independent frequency selective fading, and the intervals of transmitted symbols are lengthened to minimize the inter-symbol interference. Orthogonal frequency division multiple access (OFDMA) refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, resultantly, frequency resources are mutually exclusively allocated to the users.

As the media broadcasts are digitalized, a digital broadcast service is supported through a wireless communication system. Following digital broadcastings such as a digital audio broadcasting (DAB) that allows transmitting characters, figures, video, or the like, as well as quality voice, a digital video broadcasting (DVB), a digital television broadcast standard of Europe, or the like, a digital multimedia broadcasting (DMB) service combining mobile communication and digital broadcast is in service, and research on a digital broadcast service in a wireless communication system is ongoing.

The digital broadcast service in a wireless communication system is provided such that a base station transmits the same contents to a plurality of user equipments. However, a reception performance of the contents varies due to a difference of channel environments according to a location or mobility of the user equipment. So, providing of the same contents without consideration of the channel environment or the reception performance of the user equipment is not effective in terms of quality of service (QoS).

Thus, a method for providing contents of various qualities according to a channel environment or a reception performance of a user equipment in a digital broadcast service through a wireless communication system is required.

DISCLOSURE OF INVENTION

Technical Problem

The present invention is designed to solve such a problem of the related art, and therefore, an object of the present invention is to provide a method of providing contents of various qualities according to a channel environment or a reception performance of a user equipment in a digital broadcast service.

Technical Solution

In an aspect, a method of transmitting data in a wireless communication system includes mapping first data to first symbols on a signal constellation, mapping second data assisting the first data to second symbols on the signal constellation, modulating the first symbols and the second symbols, and transmitting the modulated first symbols and the second symbols, wherein the distance between the first symbols is longer than that between the second symbols on the signal constellation.

In another aspect, a method of transmitting data for a digital broadcast service in a wireless communication system includes transmitting first data through an multicast broadcast service (MBS) zone to support the digital broadcast service, and multiplexing second data assisting the first data to the first data, and transmitting the same.

Advantageous Effects

Basic multimedia data and additional data can be multiplexed and transmitted, so contents of various qualities can be provided with limited radio resources, and the user equipment can use an appropriate digital broadcast service according to its channel environment or performance.

BRIEF DESCRIPTION OF THE DRAWINGS

FIG. 1 is a schematic block diagram showing one example of a wireless communication system.

FIG. 2 is a drawing illustrating an example of a frame structure.

FIG. 3 is a schematic block diagram of a transmitter according to one embodiment of the present invention.

FIG. 4 is a block diagram showing a contents multiplexing method according to one embodiment of the present invention.

FIG. 5 is a schematic block diagram of a transmitter according to another embodiment of the present invention.

FIG. 6 is a block diagram showing a contents multiplexing method according to another embodiment of the present invention.

FIG. 7 shows an example of contents symbols multiplexed by using the method of FIG. 6.

FIG. 8 is a block diagram showing a contents multiplexing method according to still another embodiment of the present invention.

MODE FOR THE INVENTION

FIG. 1 is a schematic block diagram showing one example of a wireless communication system. The wireless communication system can be widely deployed to provide a variety of communication services, such as voices, packet data, etc.

Referring to FIG. 1, the wireless communication system includes a base stations (BS) 20 and user equipment (UE) 10. The UE 10 may be fixed or have mobility, and may be referred to as another terminology, such as a mobile station (MS), a user terminal (UT), a subscriber station (SS), a wireless device, etc. The BS 20 generally refers to a fixed station that communicates with the UE 10 and may be called another terminology, such as a node-B, a base transceiver system (BTS), an access point, etc. There are one or more cells within the coverage of the BS 20.

Hereinbelow, downlink refers to communication link from the BS 20 to the UE 10, and uplink refers to communication link from the UE 10 to the BS 20. In the downlink, a transmitter may be a part of the BS 20, and a receiver may be a part of the UE 10. In the uplink, a transmitter may be a part of the UE 10, and a receiver may be a part of the BS 20.

There is no restriction in a multiple access scheme applied for the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or the like.

The BS 20 may provide a digital broadcast service to at least one UE 10. In the wireless communication system, the digital broadcast service is called a multicast broadcast service (MBS). The MBS includes an MBS by a single BS (it is called Single-BS MBS) and an MBS by multiple BSs (it is called Multiple-BS MBS). In the Single-BS MBS, the UE 10 is assigned a connection identifier (CID) or a security association (SA) from the single BS to access the MBS. In the multiple-BS MBS, multiple BSs simultaneously transmit the same digital broadcast contents, and the UE 10 receives the digital broadcast contents from the multiple BSs that use the same CID or SA.

FIG. 2 shows an example of a frame structure. The frame refers to a data sequence during a fixed time period used by physical specifications. It may refer to 8.4.4.2 paragraph of "Part 16: Air Interface for Fixed Broadband Wireless Access Systems" of IEEE standards 802.16-2004.

Referring to FIG. 2, the frame includes a downlink frame (DL) and an uplink frame (UL). Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, a burst region, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between a downlink burst and a subsequent uplink burst. A receive/transmit transition gap (RTG) refers to a gap between the uplink burst and a subsequent downlink burst.

The preamble is used for initial synchronization between a BS and a UE, cell search, frequency offset, and channel estimation. The FCH includes the length of a DL-MAP message and coding scheme information of the DL-MAP message.

The DL-MAP is a region on which the DL-MAP message is transmitted. The DL-MAP message defines an access of a downlink channel. The DL-MAP message includes a configuration change count of a downlink channel descriptor (DCD) and a BS identifier (ID). The DCD describes a downlink burst profile applied to a current map. The downlink burst profile refers to characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a uplink channel descriptor (UCD) and a valid start time of uplink allocation defined by the UL-MAP. The UCD describes an uplink burst profile. The uplink burst profile refers to characteristics of an uplink physical channel, and the UCD is periodically transmitted by the base station via a UCD message.

An MBS zone is included in the downlink burst region. The MBS zone is used for a digital broadcast service. The MBS zone includes contents (or data) for the digital broadcast service, and information about the position and size of the contents. The position of the MBS zone is determined by the DL-MAP. The position of the MBS zone may be fixed or varied in the frame. Here, the MBS zone occupies a single OFDMA symbol (k+M) in the downlink burst region, but it is merely an example and the MBS zone may occupy a plurality of OFDMA symbols or one or more sub-channels.

Hereinafter, a slot is a minimum available data allocation unit and defined as time and a subchannel. The number of subchannels depends upon the size of FFT and time-frequency mapping. Subchannels include a plurality of subcarriers. The number of sub-carriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In the first step, data is mapped to at least one data slot in at least one logical subchannel. In the second step, each logical subchannel is mapped to physical subcarriers. This is called permutation. Reference document 1 discloses FUSC, PUSC, optional-FUSC (O-FUSC), optical-PUSC (O-PUSC), adaptive modulation and coding (AMC), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to physical subcarriers distributed in the entire physical channels. This mapping changes at every OFDM symbol. A slot includes a single subchannel in a single OFDM symbol. The O-FUSC has a different pilot allocation scheme from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, subcarriers are divided into tiles including four contiguous physical subcarriers on three OFDM symbols. Each subchannel includes six tiles. Pilot is allocated to the corner of each tile. The O-PUSC is used only for uplink transmission, and each tile includes three continuous physical subcarriers on three OFDM symbols.

FIG. 3 is a schematic block diagram of a transmitter according to an embodiment of the present invention.

Referring to FIG. 3, a transmitter 100 includes a scheduler 110, a channel encoder 120-A and B, a mapper 130, a multiplexer 140, and an OFDM modulator 150. The transmitter 100 includes the Nt (Nt≧1) number of transmit antennas 160. The transmitter 100 may be a part of a base station.

The scheduler 110 receives primary contents to output primary data streams (P), and receives secondary contents to output secondary data streams (S). The primary contents are basic multimedia data for digital broadcasting, and the secondary contents are additional data assisting the primary contents. For example, the primary contents may be data that can be independently decoded, and the secondary contents may be additional data that may improve resolution of the primary contents. The scheduler 110 selects a code rate and a modulation and coding scheme (MCS) and transmits the same to the channel encoders 120-A and B and the mapper 130.

The channel encoder 120-A and B encode the inputted data streams according to a determined coding scheme to generate coded data. The channel encoder-A 120-A and the channel encoder-B 120-B may employ the same coding scheme or different coding schemes. The mapper 130 disposes the coded data as symbols expressing positions on a signal constellation according to a modulation scheme. On the signal constellation, as the distance between symbols is longer, the symbols becomes more robust to noise and interference (or error). The mapper 130 maps the coded data (R) inputted from the channel encoder-A 120-A to signal constellation symbols robust to noise and interference, and maps the coded data (W) inputted from the channel encoder-B 120-B to signal constellation symbols which are relatively weak to noise and interference. Namely, the mapper 130 may modulate the data respecting to the primary contents and the data respecting to the secondary data according to the same modulation scheme, and map them together. In this case, the modulation schemes are not limited and may be m-phase shift keying (m-PSK) or m-quadrature amplitude modulation (m-QAM). For example, the m-PSK may be BPSK, QPSK, or 8-PSK, and the m-QAM may be 16-QAM, 64-QAM, or 256-QAM.

The multiplexer 140 allocates inputted symbols to proper subcarriers, and multiplexes them according to a user. The OFDM modulator 150 modulates the inputted symbols according to an OFDM scheme and outputs OFDM symbols. The OFDM modulator 150 may perform inverse fast Fourier transform (IFFT) on the inputted symbols, and insert a cyclic prefix (CP) to the time domain symbols that have been subjected to the IFFT. The OFDM symbols are transmitted via the transmit antenna 160.

FIG. 4 is a block diagram showing a contents multiplexing method according to one embodiment of the present invention.

Referring to FIG. 4, the primary contents are encoded according to a coding scheme A (Channel Encoding A). The data streams of the primary contents become first coded data. The first coded data are mapped to the signal constellation symbols or bits robust to noise and interference.

The secondary contents are encoded according to a coding scheme B (Channel Encoding B). The data stream of the secondary contents become second coded data. In this case, the coding scheme A and the coding scheme B may be the same or different. The second coded data are mapped to signal constellation symbols or bits which are relatively weak to noise and interference. In this case, the same modulation scheme is applied for the first coded data and the second coded data.

The robust symbols formed from the primary contents and the weak symbols formed from the secondary contents are multiplexed to form MBS symbols. The MBS symbols are those obtained by multiplexing the primary contents (first data) and the secondary contents (second data). Here, the modulation scheme 16-QAM is assumed to have been applied. Besides the 16-QAM, various other modulation schemes may be also applicable. The MBS symbols are transmitted on the MBS zone for supporting a digital broadcast service.

If a user equipment (UE) is in a good channel state, it can decode the data of the primary contents and the data of the secondary contents from reception signals, and combine the primary and secondary contents to use a digital broadcast service of a good quality. If a UE is not in a good channel state, it can decode at least the data of the primary contents mapped to the symbols robust to noise and interference and use a digital broadcast service of a basic quality.

Here, it has been described that single basic multimedia data and single additional data are multiplexed and transmitted, but without being limited thereto, single basic multimedia data and two or more additional data may be multiplexed and transmitted. If the constellation order of a signal constellation is so high as to divide bits with sensitivity discriminated with respect to errors, the quality of the digital broadcast service may be further divided according to error sensitivity. For example, contents may be divided into three types according to error sensitivity: primary contents include basic multimedia data, secondary contents include primary additional data with quality higher by one notch than that of the primary contents, and tertiary contents may include secondary additional contents with quality by further one notch higher than the primary contents. Namely, single basic multimedia data and a plurality of additional data may be multiplexed and transmitted. If QoS is not divided according to error sensitivity in the mapping process, the coding scheme may be adjusted in the encoding process to further divide quality of the digital broadcast service.

FIG. 5 is a schematic block diagram of a transmitter according to another embodiment of the present invention. Compared with the transmission in FIG. 3, a mapper for primary contents and a mapper for secondary contents are separately provided. The difference between the transmitter according to another embodiment of the present invention and that according to former embodiment will now be described.

Referring to FIG. 5, a transmitter 200 includes a scheduler 210, a channel encoder 220-A and B, a mapper 230-A and B, a multiplexer 240, and an OFDM modulator 250. The transmitter 200 includes the Nt (Nt≧1) number of transmit antennas 260. The transmitter 200 may be a part of a base station.

The scheduler 210 receives primary contents to output primary data streams (P), and receives secondary contents to output secondary data streams (S).

The channel encoder-A 220-A encodes the inputted primary data streams (P) according to a determined coding scheme to form first coded data (R1). The channel encoder-B 220-B encodes the inputted second data streams (S) according to a determined coding scheme to form second coded data (W1).

The mapper-A 230-A disposes the first coded data R1 as first symbols R2 expressing positions on a signal constellation on a first layer according to a modulation scheme. The mapper-B 230-B disposes the second coded data W1 as second symbols W2 expressing positions on the signal constellation on a second layer according to a modulation scheme. Namely, the first symbols (R2) and the second symbols W2 are mapped, respectively. The mapper-A 230-A and the mapper-B 230-B may employ the same modulation scheme or different modulation schemes. There is no limitation in the modulation schemes, but in this respect, a modulation scheme having a signal constellation which is more robust than that of the second layer is applied to the first layer. For example, although the mapper-A 230-A and the mapper-B 230-B employ the same modulation scheme, the mapper-A 230-A may perform mapping such that the distance between symbols is longer on the signal constellation than that of the mapper-B 230-B.

The multiplexer 240 multiplexes the first symbols R2 and the second symbols W2. Namely, the multiplexer 240 multiplexes the first and second layers to form multiplexed symbols. The OFDM modulator 250 modulates the inputted symbols according to an OFDM scheme to output OFDM symbols. The OFDM symbols are transmitted via the transmit antenna 260.

FIG. 6 is a block diagram showing a contents multiplexing method according to another embodiment of the present invention. FIG. 7 shows an example of contents symbols multiplexed by using the method of FIG. 6.

Reference to FIGS. 6 and 7, primary contents are mapped to a first layer (layer 1) to modulate into signal constellation relatively robust to noise and interference, and secondary contents are mapped to a second layer (layer 2) to modulate into signal constellation relatively weak to noise and interference compared with the first layer. And the primary contents are multiplexed with the secondary contents. The distance between symbols on the signal constellations of the first and second layers may be previously determined in consideration of error robustness. Alternatively, an error robustness of each layer may be determined by adjusting a repetition factor (N) of the first layer and a repetition factor (M) of the second layer.

Symbol streams of the first layer are repeated by the repetition factor of N (N≧1 and integer) so as to be encoded (Repetition N). The symbol streams of the first layer (primary data streams) are those generated from the primary contents. Namely, the data streams of the primary contents are encoded to become first coded data. The first coded data is mapped to a first permutation (permutation 1).

Symbol streams of the second layer (secondary data streams) are repeated by a repetition factor of M (M≧1 and integer) so as to be encoded (Repetition M). The symbols streams of the second layer are those generated from the secondary contents. Namely, the data streams of the secondary contents are encoded to become the second coded data, and the second coded data are mapped to a second permutation (permutation 2).

The symbol streams of the first layer and the symbol streams of the second layer are added in the mixed order according to the respective permutations to become multiple modulation symbols. Namely, the primary contents (first data) and the secondary contents (second data) are mapped to respective permutations so as to be multiplexed.

For example, it is assumed that symbols are mapped according to the QPSK modulation scheme in the first and second layers (See FIG. 7). The distance between the symbols of the first layer is longer than that between the symbols of the second layer. If a repetition factor of the first layer is 1, a repetition of the second layer is 4. The symbols of the first layer and the symbols of the second layers are multiplexed to generate multiple modulation symbols. In the multiple modulation symbols, the symbols of the first layer and the symbols of the second layer are distributed in a ratio of 1:4. This is merely an example, and there is not limitation in the modulation methods. The symbols of the first and second layers may be adjusted in various ratios, and accordingly, the error robustness of the first and second layers may be adaptively adjusted.

The multiple modulation symbols are transmitted through the MBS zone to support a digital broadcast service. The UE may decode data of the first layer or data of the first and second layers according to a channel state.

Meanwhile, the first and second layers may adjust the error robustness of each layer by applying different scaling factors. Equation 1 shows a method for generating multiple modulation symbols by using a scaling factor.

MathFigure 1

$$S_M = \alpha_1 \cdot S_{L1} + \alpha_2 \cdot S_{L2}$$ [Math.1]

wherein $S_M$ is a multiple modulation symbol, $S_{L1}$ is a symbol of the first layer, $S_{L2}$ is a symbol of the second layer, $\alpha_1$ is a scaling factor of the first layer, and $\alpha_2$ is a scaling factor of the second layer.

A larger value of the scaling factor of the first layer than that of the scaling factor of the second layer may be used to make the distance between the symbols of the first layer longer than the distance between the symbols of the second layer on the signal constellation. Then, the error robustness of the symbols of the first layer is increased while the error robustness of the symbols of the second layer is relatively reduced. The symbols of the first and second layers may be multiplexed to generate multiple modulation symbols.

The method for multiplexing the primary and secondary contents with the two layers has been described, but the number of layers may vary. For example, there or more scaling factors that adjust the error robustness of the layers may be applied to generate multiple modulation symbols with the symbols of three or more layers. Alternatively, there may be three or more distances between symbols of each layer or the repetition factors may be provided variably to generate multiple modulation symbols with the symbols of there or more layers.

FIG. 8 is a block diagram showing a contents multiplexing method according to still another embodiment of the present invention.

Referring to FIG. 8, primary contents and secondary contents are discriminated, the primary contents may be transmitted by using a general modulation scheme while the secondary contents may be transmitted by using an OFDMA inter-symbol modulation or differential modulation.

Numerous pilots may be disposed at the MBS zone, and pilot sets may be discriminated by certain repetition factors according to pilots. A single pilot set includes one pilot and one or more data subcarriers. Here, it is assumed that pilots are divided into three pilot sets in the MBS zone. If it is assumed that there is not much change in channels, differential modulation may be performed on the pilot sets. That is, the primary contents symbols may be included in the MBS zone according to a repletion factor, and the secondary contents symbols may be inserted into the other remaining pilot sets than one pilot set. Thus, symbols of the (repetition factor-1) number of secondary contents may be inserted into a single OFDMA symbol.

Herein, the primary contents symbols may be included in the single pilot set, while the differential modulation is applied to the other remaining pilot sets, but this is merely an example. That is, different symbols may be inserted to the respective pilot sets and the differential modulation may be applied thereto. In this case, a pilot signal itself may be indefinite, so modulation symbols corresponding to a pilot set may be additionally multiplied to data subcarriers. Thus, for the data substrates which are affected by each pilot set, indefiniteness due to additional modulation between pilots and data subcarriers can be avoided.

The data subscribers in the same OFDMA symbol are discriminated, to which differential modulation symbols are applied in a time axis, to thus modulation between OFDMA symbols can be applied. If there is not much change in channels between OFDMA symbols, a modulation symbol may be detected through differential detection between a temporally preceding OFDMA symbol and a subsequent OFDMA symbol. In this case, differential modulation applied for a pilot set matched to the preceding OFDMA symbol. In order to prevent generation of indefiniteness of data subcarriers due to modulation applied to pilot, the same modulation symbols should be applied to the corresponding data subcarriers. And in order to prevent error spreading, a differential chain may be started again to thereby prevent an excessive increase of the OFDMA symbols applied to the corresponding differential modulation.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting data in a wireless communication system, the method comprising:

generating first coded data by repeating first data of a first layer based on a first repetition factor of the first layer;

generating second coded data by repeating second data of a second layer based on a second repetition factor of the second layer, the second repetition factor being larger than the first repetition factor;

mapping the first coded data to first symbols on a signal constellation by a first permutation;

mapping the second coded data assisting the first data to second symbols on the signal constellation by a second permutation;

multiplexing the first symbols and the second symbols by adding the first symbols and the second symbols in mixed order to generate multiple modulation symbols; and transmitting the multiple modulation symbols through a multicast broadcast service (MBS) zone in a downlink burst region, wherein a distance between the first symbols is longer than that between the second symbols on the signal constellation, wherein a first scaling factor is applied to the first layer, second scaling factor is applied to the second layer, and the first scaling factor is larger than the second scaling factor, and wherein the multiple modulation symbols are generated by Equation below:

$$S_M = \alpha_1 \cdot S_{L1} + \alpha_2 S_{L2},$$

where $\alpha_1$ is the first scaling factor, $S_{L1}$ is one of the first symbols, $\alpha_2$ is the second scaling factor, and $S_{L2}$ is one of the second symbols.

2. The method of claim 1, wherein the first symbols and the second symbols are mapped together.

3. The method of claim 1, wherein the first symbols and the second symbols are mapped respectively.

4. The method of claim 1, wherein the second data is differentially modulated.

* * * * *